United States Patent [19]

Debroy et al.

[11] Patent Number: 4,605,690

[45] Date of Patent: Aug. 12, 1986

[54] LOW VOLATILE ORGANIC CONTENT CATHODIC ELECTRODEPOSITION BATHS

[75] Inventors: Tapan K. Debroy, Novi, Mich.; Dave W. Braun, Toledo, Ohio; Ding-Yu Chung, Farmington Hills, Mich.

[73] Assignee: Inmont Corporation, Clifton, N.J.

[21] Appl. No.: 723,589

[22] Filed: Apr. 15, 1985

[51] Int. Cl.$^4$ .................. C09D 5/46; C09D 3/58
[52] U.S. Cl. .................. 523/414; 204/181.7; 524/901
[58] Field of Search .......... 523/414; 204/181.7; 524/901

[56] References Cited

U.S. PATENT DOCUMENTS

| | | | |
|---|---|---|---|
| 3,468,779 | 9/1969 | Slater et al. | 204/181.7 |
| 3,922,253 | 11/1975 | Jerabek et al. | 528/45 |
| 3,936,405 | 2/1976 | Sturni et al. | 523/414 |
| 3,984,299 | 10/1976 | Jerabek | 204/181.7 |
| 4,093,594 | 6/1973 | Anderson | 525/523 |
| 4,104,147 | 8/1978 | Marchetti et al. | 204/181.7 |
| 4,116,900 | 9/1978 | Belanger | 523/404 |
| 4,134,864 | 1/1979 | Belanger | 523/420 |
| 4,137,140 | 1/1979 | Belanger | 204/181.7 |
| 4,139,510 | 2/1979 | Moriarity et al. | 525/531 |
| 4,182,831 | 1/1980 | Hicks | 528/103 |
| 4,225,478 | 9/1980 | Hicks | 523/414 |
| 4,225,479 | 9/1980 | Hicks | 523/415 |
| 4,296,010 | 10/1981 | Tominaga | 524/901 |
| 4,297,255 | 10/1981 | Schenck et al. | 524/901 |
| 4,297,261 | 10/1981 | Jozwiak | 524/901 |
| 4,339,369 | 6/1982 | Hicks et al. | 523/414 |
| 4,419,467 | 12/1983 | Wismer et al. | 523/414 |
| 4,419,468 | 12/1983 | Lucas | 523/414 |
| 4,432,850 | 2/1984 | Moriarity et al. | 204/181.7 |
| 4,468,307 | 8/1984 | Wismer et al. | 204/181.7 |

*Primary Examiner*—Ronald W. Griffin
*Attorney, Agent, or Firm*—Emil Richard Skula

[57] ABSTRACT

A reactive diluent for use in an amine-containing epoxy resin composition. The reactive diluent comprises a soft, blocked isocyanate crosslinking agent. This reactive diluent is incorporated into the resin in addition to the primary crosslinking agent. The use of the reactive diluent eliminates or substantially reduces the need for volatile organic coalescent solvents and produces smooth, durable corrosion resistant coatings.

6 Claims, No Drawings

LOW VOLATILE ORGANIC CONTENT CATHODIC ELECTRODEPOSITION BATHS

TECHNICAL FIELD

The field of art to which this invention pertains is epoxy resins, and, more specifically epoxy resin compositions containing crosslinking agents for use in cathodic electrocoat processes.

BACKGROUND ART

Cathodic electrodepositable resin compositions are well known in the art. The resins are typically manufactured from polyepoxide resins which have been chain extended and adducted to include a primary nitrogen. The nitrogen is typically introduced through reaction with an amine compound. The cathodic electrocoat resins are typically blended with a crosslinking agent and salted with an acid to form a water emulsion, commonly referred to as a principal emulsion.

The principal emulsion is combined with a pigment paste, water, coalescent solvents, antifoam agents, etc., at the coating site to form an electrodeposition bath. The electrodeposition bath is typically contained in an electrically insulated tank containing an anode. The object to be coated comprises an electrically conductive material. The object is connected to a direct current circuit and acts as a cathode when immersed in the tank in combination with the previously mentioned anode. The flow of current through the object results in an electromotive force being exerted upon the principal resin and the pigment paste resulting in the deposition of a layer of resin and pigment paste upon the object. The thickness of the layer is a function of the principal emulsion, the pigment paste, the bath components, the electrical operating characteristics, the immersion time, etc.

The coated object is removed from the bath once the desired film thickness is obtained. The object is rinsed with deionized water and the coating is cured typically in an oven at sufficient temperature to produce crosslinking.

Cathodic electrodepositable resin compositions, coating baths, and cathodic electrodeposition processes are disclosed in U.S. Pat. Nos. 3,922,253; 3,984,299; 4,093,594; 4,134,864; 4,137,140; 4,419,467 and 4,468,307, the disclosures of which are incorporated by reference.

It is critical that the electrodeposited coating be smooth, have uniform thickness, and be free of defects such as craters, orange peel, etc., since the electrodeposited coating will be typically coated with a finish paint or topcoat (e.g., a pigmented base coat and a clear topcoat). It is known that the smoothness of a coating is related to the presence of coalescent solvents in the coating bath. Coalescent solvents are volatile organic compounds such as ethylene glycol monomethylether, ethylene glycol monobutylether, diethylene glycol monobutylether, ethanol, isopropanol, ethylene glycol monohexylether, propylene glycol monophenylether, Synfac ™, and PCP ™. The coalescent solvents are typically present in a coating bath in a range of about 2.5 wt. % to about 5.0 wt. %, typically about 2.9 wt. %, wherein the bath has a concentration of about 20 wt. % to about 25 wt. % solids. It is known that the absence of coalescent solvents in a coating bath will result in electrodeposited coatings which are rough, have nonuniform thickness, have craters, and have low rupture voltage. It is theorized that this occurs since the coalescent solvents act as plasticizers to lower the Tg of the system. Tg is defined as a glass transition temperature. In addition, it is thought that the coalescent solvents help the dispersed particles in the coating bath to deposit uniformly.

There is a constant search in the coatings industry for low VOC (Volatile Organic Content) coatings. This is particularly true in high volume, high use production operations such as automobile assembly plants. In order to meet government emission regulations and protect the safety and health of the workers, it is desirable to eliminate the VOC of coatings such as electrodeposited cationic coatings.

Accordingly, what is needed in this art is a principal emulsion and an electrodeposition bath in which coalescent solvents are substantially reduced or eliminated.

DISCLOSURE OF INVENTION

It has now been found that by incorporating certain low Tg crosslinking agents into cathodic electrodepositable resins, improved emulsions are obtained. Specifically, a cathodic electrodepositable resin composition of the type comprising an epoxy resin/amine adduct, wherein the adduct is mixed with a primary crosslinking agent and salted to form a principal emulsion is disclosed. The improvement comprises the inclusion of an additional low Tg crosslinking agent as a reactive diluent in the principal emulsion, thereby producing a principal emulsion which, when incorporated into a coating bath, produces smooth electrodeposited films thereby eliminating or substantially reducing the need for volatile organic coalescent solvents.

Another aspect of this invention is an improved cathodic electrodeposition bath containing a mixture of a principal emulsion, wherein the principal emulsion comprises a salted amine-containing epoxy resin particularly adapted for use as a film forming composition in an electrodeposition process and a primary crosslinking agent, a pigment paste, and water. The improvement comprises incorporating into the principal emulsion an additional, low Tg crosslinking agent as a reactive diluent, thereby eliminating or substantially reducing the need for volatile organic coalescent solvents in the coating bath and producing smooth electrodeposited films.

Yet another aspect of this invention is a method of electrocoating an object in a cathodic electrodeposition bath. The method comprises forming an amine/epoxy resin adduct, salting the resin with an acid, mixing the adduct with a first crosslinking agent, and then mixing the adduct with a reactive diluent comprising a second low Tg crosslinking agent, thereby forming a principal emulsion. The principal emulsion is mixed with a pigment paste and water to form a coating bath, a conductive article is connected to a DC electric circuit to act as a cathode, the article is immersed in the bath, an electric current is passed through the article, thereby depositing a film of resin and pigment paste on the article, and removing the article from the bath and curing the film. A smooth deposited film is produced, thereby eliminating or substantially reducing the need for volatile organic coalescent solvents.

The foregoing, and other features and advantages of the present invention will become more apparent from the following description.

BEST MODE FOR CARRYING OUT THE INVENTION

The reactive diluents used in the practice of this invention comprise low Tg, blocked crosslinking agents. A reactive diluent is defined to mean a crosslinking agent which acts like a coalescent solvent in that it plasticizes the system (i.e., the deposited film). The reactive diluent also plasticizes the principal resin and helps disperse the system. In essence, the reactive diluent replaces coalescent solvents in a cathodic electrodeposition process. As previously mentioned, the reactive diluents are blocked crosslinking agents having a low Tg. Tg is defined to mean the temperature at which a material changes from a highly disordered, rubber-like solid to a brittle, glass-like solid with no elastomeric properties.

Low Tg is defined as Tg below ambient temperature, for example, below 72° F.

The crosslinking agents useful in the practice of this invention as reactive diluents are the blocked organic polyisocyanates, characterized by low Tg.

The reactive diluents of this invention are stable in dispersion systems at ordinary room temperature and react with conventional cathodic electrodepositable resins at elevated temperatures. The reactive diluents of the present invention are made by reacting a blocking agent with a low Tg polyisocyanate. Examples of organic polyisocyanates useful as reactive diluents include low Tg aliphatic and aromatic polyisocyanates such as the isocyanurate of hexamethylene diisocyanate, the biuret of hexamethylene diisocyanate, and the adducts of toluene diisocyanate and ethoxylated or propoxylated trimethylol propane. Examples of blocking agents include oximes, alcohols, phenols and caprolactom.

A particularly preferred isocyanate useful as a reactive diluent is the isocyanurate of hexamethylene diisocyanate blocked with ethylene glycol monopropyl ether or ethylene glycol monohexyl ether.

As previously mentioned, the reactive diluent is mixed with a principal resin, a crosslinking agent, and the mixture is then salted to form a principal emulsion.

The organic polyisocyanates used in the practice of this invention as primary crosslinking agents are typical of those used in the art, e.g., U.S. Pat. No. 4,182,831, the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates used as primary crosslinking agents, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4"-triisocyanate, 1,3,5-triisocyanate benzene and 2,4,6-triisocynate toluene; and the tetraisocyanates such as 4,4'-diphenyl-dimethyl methane-2,2',5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g. ethylene glycol and propylene glycol, as well as other polyols such as glycerol, trimethylolpropane, hexanetriol, pentaerythritol, and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Particularly preferred polyisocyanates include the reaction product of toluene diisocyanate and trimethylol propane and, the isocyanurate of hexamethylene diisocyanate.

The blocked polyisocyanates of this invention (both primary crosslinking agents and reactive diluents) are formed by reacting sufficient quantities of blocking agent with sufficient quantities of organic polyisocyanate at a sufficient temperature for a sufficient amount of time under reaction conditions conventional in this art such that no free isocyanate groups are present when the reaction has run its course. Typically about one equivalent of polyisocyanate is charged into a conventional reactor vessel. Typically about one equivalent to about two equivalents of a blocking agent is added, preferably about one equivalent to about 1.1 equivalents. In addition one or more of the following compositions is charged: methyl isobutyl ketone, butanol, methyl ethyl ketone, toluol, or an equivalent organic solvent.

The reaction temperature varies with the type of polyisocyanate used, for example, when reacting toluene disocyanate-trimethanol propane with a ketoxime, the reaction is typically carried out at about 150° F. to about 220° F., more typically about 160° F. to about 210° F., and preferably about 180° F. to about 200° F. The reactor charge is mixed for about 15 minutes to about 120 minutes, more typically about 20 minutes to about 40 minutes, and preferably about 25 minutes to about 35 minutes. The ketoxime blocked polyisocyanate is left in solution after the reaction is complete.

As previously mentioned the blocked reactive diluents of this invention are prepared in a manner similar to that of the primary blocked polyisocyanate crosslinking agents.

The cathodic electrodepositable coating compositions of this invention comprise amine-containing epoxy resins which may optionally be chain-extended resulting in an increase in the molecular weight of the epoxy molecules by reacting with water miscible or water soluble polyols.

The epoxides useful in the practice of this invention are the polyepoxides typically used in this art and comprise a resinous material containing at least one epoxy group per molecule.

A particularly useful class of polyepoxides are the glycidyl polyethers of polyhydric phenols.

Such polyepoxide resins are derived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis(2-hydroxynaphthy) methane, 1,5-dihydroxynaphthylene and the like with Bisphenol A being preferred. These polyepoxide resins are well known in the art and are made in desired molecular weights by reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000, more typically about 800 to about 1,600 and preferably about 800 to about 1,500.

The polyepoxides used in the practice of this invention will have a relatively high molecular weight, that is, the molecular weight will typically be about 900 to about 4,000, more typically about 1,600 to about 3,200, and preferably about 1,600 to about 2,800.

Another quite useful class of polyepoxides are produced similarly from novolak resins or similar polyphenol resins.

Also suitable are the polyepoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis (4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid terephthalic acid, 2,6-naphthylane dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogeneous diepoxides such as disclosed in U.S. Pat. No. 3,365,471; epoxy resins from 1,1-methylene bis (5-substituted hydantoin), U.S. Pat. No. 3,391,097; bis-imide containing diepoxides, U.S. Pat. No. 3,450,711; epoxylated ammomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Although the reactive diluents of the present invention can be used successfully with conventional amine containing-epoxy resins known in the cathodic electrodeposition art, it is preferable to use modified epoxy resins. Specifically, the modified epoxy resins used in the practice of this invention will comprise one of the aforementioned epoxy resin compositions chain extended with a water miscible or water soluble polyol, reacted with excess amine, and finally reacted with a fatty acid or aliphatic monoepoxide.

The water soluble or water miscible polyols, used to optionally chain extend epoxy resins, include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000, more typically about 300 to about 1,000, and preferably about 400 to about 700.

Water miscible is defined as the ability or tendency of the polyol to mix or blend uniformly with water. By water soluble is meant the ability or tendency of the polyol to blend uniformly with water.

The organic polyols which are used in the practice of this invention are those known in the art, e.g. polyols disclosed in U.S. Pat. No. 4,104,147 which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specific examples of the organic polyols used in the practice of this invention include Tone 200 brand polyol manufactured by Union Carbide Corp., Carbowax PG 300 and Carbowax PG 400 polyols manufactured by Union Carbide Corp., SynFac 8007 and SynFac 8008 brand polyols manufactured by Milliken Chemical Co., Spartanburg, S.C., and Hycar HTBN brand polyol manufactured by B. F. Goodrich Chemical Corp., Cleveland, Ohio. A particularly preferred polyol is SynFac 8008 brand.

The modification of the polyepoxide, that is, the chain extension and corresponding increase of molecular weight, is accomplished by mixing the organic polyol with the polyepoxide in an organic solvent, such as toluene, methyl isolbutyl ketone xylene, etc., and reacting these products at a sufficient temperature for a sufficient amount of time in a conventional reactor in the presence of a catalyst to completely react the polyepoxide. Typically, the reaction temperature will be about 200° F. to about 350° F., more typically about 250° F. to about 320° F., preferably about 260° F. to about 300° F.

Typically the reaction time is about 120 minutes to about 300 minutes, more typically about 160 minutes to about 260 minutes, preferably about 180 minutes to about 240 minutes.

Typically about 1.5 to about 3 epoxide equivalents of polyepoxide are reacted, more typically about 2 to about 2.5, preferably about 2 equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

The polyamines used in the practice of this invention are typical of those known in the art such as the polyamines disclosed in U.S. Pat. No. 4,139,510, which is incorporated by reference.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, 3 to about 8 amine hydrogen atoms and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, o,m and p-phenylene diamine 4,4'-methylene dianiline, menthane diamine, 1,4-diaminocyclohexame, methyl-aminopropylamine, and the like. Preferred amines for use in this invention are alkylene polyamines of the formula:

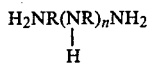

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine, tetraethylene pentamine, and diethylene triamine.

Sufficient quantities of polyamine are reacted with sufficient quantities of modified polyepoxide resin so that the adduct formed contains about 1 mole of adducted polyamine molecule for each epoxide equivalent originally present in polyepoxide resin. The adducting reaction typically requires about 1.5 to about 15.0 moles of polyamine, i.e., an excess, for each epoxide equivalent of the polyepoxide resin, more typically about 2.0 moles to about 12.0 moles, and preferably about 3.0 moles to about 10.0 moles. Since excess polyamine is used, the excess unreacted polyamine must be removed by distillation after reaction to prevent gellation of the reaction product.

In preparing the modified epoxy-polyamine compositions sufficient quantities of polyamine are reacted with sufficient quantities of modified polyepoxide resin in a conventional reactor vessel for a sufficient period of time at a sufficient temperature to react all of the epoxide groups. Typically, the reaction temperature will be about 75° F. to about 220° F., more typically about 80° F. to about 190° F., and preferably about 140° F. to about 180° F. The reaction time is typically about five minutes to about 60 minutes, more typically about ten minutes to about 40 minutes, and preferably about 25 minutes to about 30 minutes. When the adducting reaction is complete, the unreacted or excess polyamine is removed by distillation with sufficient vacuum and at a sufficient temperature to remove the excess polyamine. Typical distillation temperatures are about 275° F. to about 500° F., more typically 320° F. to about 475° F. and preferably about 425° F. to about 450° F. Typical vacuums are about 60 mmHg to about 76 mmHg, more typically about 65 mmHg to about 76 mmHg and preferably about 74 mmHg to about 76 mmHg.

Although the excess amine aproach is preferred, other conventional methods of incorporating amines into the epoxide resin can be used such as the ketimine approach, etc.

Fatty acids which can be used, to optionally modify the epoxy resins used in the practice of this invention, are monocarboxylic acids containing about 4 to 22 carbon atoms. The fatty acids may be saturated or unsaturated. The fatty acids are typical of those known in the art. Examples of such acids are caprylic acid, capric acid, stearic acid, benzoic acid, oleic acid, linoleic acid, linolenic acid and liconic acid. Such acids can be those derived from naturally occurring oils and which are named from the oil from which it is derived, e.g., linseed fatty acids, soya fatty acids, cottonseed fatty acids, cocoanut fatty acid and the like. A particularly preferred fatty acid is pelargonic acid.

The monoepoxides which can be used to optionally modify the epoxy resins used in the practice of this invention contain one 1,2-epoxide group per molecule and about 6 to about 24 carbon atoms per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 6 to about 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides or fatty acids are optionally reacted with the modified epoxy-polyamine adducts of this invention to improve the electrical insulating properties of the deposited electrodepositable resin compositions of this invention. In addition, these components improve the properties of the deposited coating such as flexibility, corrosion resistance, and hardness.

Sufficient quantities of modified epoxy-polyamine adducts are mixed with sufficient quantities of fatty acid or monoepoxide in an organic solvent such as xylene, or toluene in a conventional reactor vessel for a sufficient period of time at a sufficient temperature to complete the reaction. Typically about one mole of modified epoxy-polyamine adduct is reacted with the following amounts of fatty acid or monoepoxide.

When fatty acid is the reactant, typically about 0.5 moles to about 2.75 moles of fatty acid are reacted with the adduct, more typically about 1 mole to about 2.25 moles, and preferably about 1 mole to about 2 moles. The reaction temperature is typically about 300° F. to about 400° F., more typically about 325° F. to about 390° F., and preferably about 350° F. to about 375° F.; the reaction time is about 60 minutes to about 180 minutes, more typically about 60 minutes to about 140 minutes and preferably about 120 minutes, or until the acid value is reduced to below about 6.

When monoepoxide is the reactant, typically about 0.5 mole to about 2.25 moles of monoepoxide are reacted with the adduct, more typically about 1 mole to about 2.25 moles, preferably about 1 mole to about 2 moles. The reaction temperature is typically about 150° F. to about 300° F., more typically about 150° F. to about 280° F., and preferably about 150° F. to about 250° F.; reaction times are typically about 60 minutes to about 180 minutes, more typically about 60 minutes to about 150 minutes, and preferably about 60 minutes to about 100 minutes.

Sufficient quantities of blocked polyisocyanate primary crosslinking agent are incorporated into the electrodepositable coating compositions of this invention such that the deposited coating will be completely cured upon baking and there will be no free isocyanate groups remaining. Typically, about 20 wt. % to about 80 wt. % of primary crosslinking agent is incorporated based upon the total weight of amine containing-epoxide resin composition and crosslinking agent, more typically about 30 wt. % to about 70 wt. %, preferably about 35 wt. % to about 45 wt. %.

Sufficient amounts of the reactive diluents of this invention are mixed with the principal resin and crosslinking agent such that typically the content of reactive diluent based upon the total weight of the principal resin, primary crosslinking agent and reactive diluent is about 1 wt. % to about 50 wt. %, more typically about 2 wt. % to about 35 wt. % and preferably about 5 wt. % to about 15 wt. %. The amount of reactive diluent may vary with the type of principal resin used, the Tg of the reactive diluent, the application, etc.

The primary crosslinking agent and the reactive diluent of this invention are mixed with the amine-containing epoxy resin compositions, preferably the optionally modified epoxy-polyamine-fatty acid or epoxy-polyamine-monoepoxide reaction products, by adding the blocked polyisocyanates and the reactive diluent to a reactor containing the epoxy/amine resin composition and mixing the charge for about one-half hour.

In order to solubilize an amine-containing epoxy resin composition, i.e., form a principal emulsion, it is necessary to salt the reaction product with a water soluble acid. The acids which can be used include those known in the art such as formic acid, acetic acid, phosphoric acid, lactic acid, hydrochloric acid, etc. Sufficient quantities of the acid are mixed with said amine-containing epoxy resin compositions to solubilize or disperse the resin in water. One method in which the salting process is accomplished is by charging the amine-containing epoxy resin composition, an acid, cosolvents, water and surfactants conventional in the art into a reactor vessel, and mixing the reactor charge with a slow speed mixer until the reaction has been completed. In a preferred method, acid, water, etc. are initially added to a reactor vessel, then the resin is charged while the reactants are mixed with a slow speed mixer.

Although the primary crosslinking agent and the reactive diluent can be added prior to the acid salting step, it is preferred to add them after this step. Typically, the reaction temperature is about 25° F. to about 150° F., more typically about 100° F. to about 140° F., and preferably about 120° F. The reaction will be typically run for about 15 minutes to about 90 minutes, more typically about 25 minutes to about 80 minutes, and preferably 60 minutes.

Typically, about 0.1 Meq to about 0.8 Meq of acid is used per gram of solid resin, more typically about 0.2 Meq to about 0.7 Meq, and preferably about 0.2 Meq to about 0.5 Meq.

By using the reactive diluents of this invention the volatile organic content of the principal emulsion is typically zero or less than about 0.3 wt. % based on 36 wt. % solids for the emulsion. The reactive diluents of the invention eliminates the need for volatile organic coalescent solvents in a coating bath or substantially reduces the solvent content required to typically less than about 0.3 wt. % based on about 20 to 25 wt. % of solids for the bath.

Electrodepositable cathodic coating compositions containing the reactive diluents of this invention are used in an electrodeposition process as an aqueous dispersion or a principal emulsion. Sufficient quantities of the resin composition are used so that the concentration of the resin composition in an aqueous bath will produce a coating on an article of sufficient thickness so that upon baking the coating will have the desired characteristics such as smooth surface, high build, short coating time and low temperature cures. Typically, the concentration in an aqueous electrodeposition bath of the resin compositions of this invention is about 10 wt. % to about 40 wt. %, more typically about 10 wt. % to about 30 wt. %, and preferably about 15 wt. % to about 25 wt. %.

It should be noted that the cathodic electrodepositable resins are typically shipped by the manufacturer to the user as a salted aqueous dispersion or principal emulsion having a concentration of about 20 wt. % to about 36 wt. % of solids.

The cathodic electrodepositable coating baths of this invention are typically formed by mixing the solubilized (i.e., salted) cathodic electrodepositable resin compositions or principal emulsions of this invention in concentrate form with water, although dry resin could be used. The electrodeposition bath may contain additional ingredients such as pigments, coalescent solvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulphite, barium yellow, cadmium red, chromic green, lead silicate, etc. Sufficient quantities of pigment are used to achieve the appearance characteristics desired such as gloss, reflectance, hue, tint and other desired characteristics. Typically, the amount of pigment used is expressed in a ratio of total pigment to total binder. Typically a pigment to binder ratio of about 0.1 to about 0.4 is used in the electrodepositable resin compositions of the present invention, more typically about 0.15 to about 0.35, preferably about 0.2 to about 0.3. Pigment is typically added to the electrodeposition bath in paste form, i.e., predispersed in a composition comprising pigment, amine-containing epoxy resin, and surfactants.

The electrodeposition baths may contain slight amounts of coalescent solvents which are water soluble or partially water soluble organic solvents for the resinous vehicles used in the practice of this invention. The coalescent solvents used in the practice of this invention are those typically used and known in the art.

Examples of such coalesant solvents include monomethyl ether ethylene glycol, monoethyl ether ethylene glycol, monobutylether, diethylene glycol monobutylether, ethanol, isopropanol, n-butenol, etc. Coalescent solvents are conventionally used so that a good emulsion resulting in a smooth deposited film is produced. Typically, the amount of coalescent solvent used in the coating baths of the present invention will either be zero or less than about 0.2 wt. % based on 25 wt. % solids of the bath.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used to coat articles such as automobile or truck bodies. The typical size of an electrodeposition bath tank used for this purpose is about 60,000 gallons to about 120,000 gallons.

Typically, the article to be coated is connected to the direct current circuit so that the conductive object acts as the cathode. When the article is immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness, having sufficient resistance to corrosion and flexibility. The residence time or holding time is typically about 1 minute to about 3 minutes, more typically about 1 minute to about $2\frac{1}{2}$ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,200 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

When the desired thickness of the coating has been achieved the coated object is removed from the electrodeposition bath and cured. Typically, the electrodeposited coatings are cured in a conventional convection oven at a sufficient temperature for a sufficient length of time to unblock the blocked polyisocyanates and allow for cross-linking of the electrodepositable resin compositions. Typically, the coated articles will be baked at a temperature of about 200° F. to about 600° F., more typically about 250° F. to about 375° F., and preferably about 225° F. to about 325° F. The coated articles will be baked for a time period of about 10 minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids, and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset of crosslinking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote areas of the object is throwpower. Throwpower is a function of the electrical configuration of the anode and cathode as well as the conductivity of the electrodeposition bath.

The coatings of the coated articles of the present invention are, surprisingly and unexpectedly smooth even though the need for coalescent solvents is substantially eliminated or reduced. The addition of a low Tg crosslinking agent to the principal emulsion eliminates or substantially reduces the need for volatile organic coalescent solvents.

It should be noted that the articles which are coated by the coating compositions of this invention are typically automobile bodies which have been pretreated to remove impurities and contaminants in a phosphotizing bath.

The following example is illustrative of the principles and practice of this invention, although not limited thereto. Parts and percentages where used are parts and percentages by weight.

EXAMPLE 1A

The reactive diluent was prepared by slowly charging 1144 parts of ethylene glycol monopropyl ether to 2371 parts of Desmodur N-3390 TM (an isocyanurate of hexamethylene diisocyanate, manufactured by Mobay Chemical Co., Pittsburgh, Pa.) in a suitable reactor. The batch was held at 240° F. for an hour until essentially all of the isocyanate moiety was consumed as indicated by infrared scan. The batch was then thinned with 1027 parts of methyl isobutyl ketone and 141 parts of butanol.

EXAMPLE 1B

The following components were charged into a suitable reactor vessel: 1658 parts of Epon 828 having an epoxy equivalent weight of 188; 478 parts of Bisphenol A; 583 parts of ethoxylated Bisphenol A having a hydroxy equivalent weight of 230 (Synfac 8009 TM from Milliken Chemical Co.); and 147 parts of toluene. The charge was heated to 145° C. under a dry nitrogen blanket and 3.8 parts of benzyl dimethyl amine was added to the reactor vessel. The reaction mixture was further heated to 160° C., and held for 45 minutes. An additional 5.4 parts of benzyl dimethylamine was added, and the mixture was held at 150° C. until the desired WPE was achieved; then, 1037 parts of toluene were added to the reactor to dilute the resulting adduct B.

EXAMPLE 1C

A conventional reactor equipped with an agitator, thermometer, nitrogen line and a condensor was charged with 730 parts of triethylene tetramine. The triethylene tetramine was slowly heated to 140° F. Then, 1846 parts of the adduct of Example B were slowly added to the reactor during a one-hour time period. After the adduct B was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 500° F. over a 2.5 hour-time period. The mixture was held at this temperature until no more distillate was coming out. The temperature was then lowered to 360° F. and 158 parts of Pelargonic acid along with 50 parts of xylene were added to the reactor. The resulting mixture was heated to 360° F. and held at reflux until the acid value was down to 6. Then the reaction mixture was cooled down to ambient temperature and reduced to 56% NV (non-volatile) with methyl isobutyl ketone.

EXAMPLE 1D

The primary crosslinking agent was prepared by slowly charging 870 parts of trimethylopropane into a suitable reactor vessel containing 3387 parts of an 80/20 isomer mixture of 2,4-/2,6-toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F. at which time 2026 parts of ethylene glycol monopropyl ether were added. The charge was maintained at 210° F. to 220° F. for one and one-half hours until essentially all of the isocyanate moiety was consumed as indicated by infrared scan. The batch was then thinned with 2116 parts of methyl isobutyl ketone.

EXAMPLE 1E

The acrylic anti-cratering agent was prepared by charging 44 parts of butyl acrylic, 15 parts of hydroxyethyl acrylic, 15 parts of dimethylaminoethyl methacrylic, 2 parts of styrene, 1 part of octyl mercaptan, 4 parts of VAZO 67, and 3 parts of acetone to a refluxing mixture of 13 parts of methyl isobutyl ketone and 2 parts of acetone over a 4 hour period. After a 15 minute holding period, 0.14 parts of VAZO 67 and 1 part of methyl isobutyl ketone were added. The batch was maintained at the refuluxing temperature for another hour.

EXAMPLE 1F

The emulsion was prepared by adding 884 parts of the adduct of Example 1C, 389 parts of the crosslinker of Example 1D, 48 parts of the reactive diluent of Example 1A, and 26 parts of the anti-cratering agent of Example 1E to 15 parts of acetic acid and 1279 parts of deionized water under high agitation. After agitation for 5 days, organic solvents were driven off.

EXAMPLE 1G

The adduct 1G and the adduct 1H are the two intermediates for the grinding vehicle. The adduct 1G was prepared by charging ethylene glycol monopropyl ether to 2,6-toluene diisocyanate under agitation with a dry nitrogen blanket. The reaction was maintained at a temperature below 100° F. The charge was held an additional one and one-half hour.

EXAMPLE 1H

In a suitable reactor vessel, 455 parts of Triton X-102 TM (an alkylaryl poly- ether alcohol manufactured by Rohm and Haas, Philadelphia, Pa.) and 51 parts of methyl isobutyl ketone previously azeotroped to remove water, were added to 109 parts of 2.4 toluene diisocyanate. The reaction was maintained at 115° F. for 2 hours. Then 56 parts of dimethyl ethonolamine, were charged, and the reaction was maintained at 160° F. for 1 hour. Finally, 50 parts of ethylene glycol monobutyl ether, 75 parts of lactic acid, and 89 parts of deionized water were charged, and the reaction was held at 190° F. for one hour.

EXAMPLE 1I

The grinding vehicle was prepared by charging 88 parts of the adduct of Example 1G to a reaction vessel containing 206 parts of EPON 1002F (WPE=650 manufactured by Shell Chemical Co., Houston, Tex.) and 39 parts of methyl isobutyl ketone. The reaction temperature was maintained at 250° F. for one hour. Ethylene glycol monobutyl ether, 186 parts, and the adduct of Example 1H, 381 parts, were added. The batch was maintained at 180° F. for four hours.

EXAMPLE 1J

A pigment paste was prepared by grinding 203 parts of the grinding vehicle of Example 1I, 17 parts of ethylene glycol monobutyl ether, 274 parts of deionized water, 67 parts of aluminum silicate, 317 parts of TiO2, 30 parts of lead silicate, 6 parts of carbon black, and 19 parts of dibutyl tin oxide in a steel ball mill for about 24 hours so that the maximum particle size of the mixture was about 12 microns. Then, 66 parts of deionized water was added.

EXAMPLE 1K

A dispersion suitable for electrodeposition composed of 2577 parts of the emulsion of Example 1F, 1006 parts of deionized water, and 417 parts of the pigment paste of Example 1J was prepared by mixing to form an electrodeposition bath. The dispersion, i.e., bath, had a pH of 6.1, and a total solids content of 25%. After two weeks of agitation, all organic solvent was driven off from the bath. A phosphated steel panel electrocoated at 350 volts for two minutes gave a smooth film of 1.2 mil thickness after a 325° F. bake. The GM throwpower test showed twelve and one-quarter inches of throw power. After 672 hours in salt spray, phosphated steel panels showed <0.027 inch creep, and clear steel panels show <0.083 inch creep.

EXAMPLE 2A

The following components were charged into a suitable reactor vessel: 702 parts of EPON 828, 243 parts of ethoxylated Bisphenol A (Synfac 8009 from Milliken Chemical Co.) and 60 parts of xylene. The mixture was heated to 200° C.–215° C. to remove any water present. The mixture was cooled to 150° C., and 198 parts of bisphenol A and 1.6 parts of benzyldimethyl amine were added. The mixture was heated to 150° C. and held between 150° C. and 190° C. for about one-half hour and then cooled to 130° C. Benzyldimethyl amine, 2.2 parts, was added and the reaction mixture was held at 130° C. for about two and one-half hours until a reduced Gardner-Holdt viscosity (50% resin solution in 2-ethoxyethanol) of N-O was obtained. Then added were 991 parts of the polyurethane crosslinker (a reaction product of trimethyolpropane and a half-capping toluene diisocyanate (80/20 2,4-/26-isomer mixture with 2-hexoxyethanol) in a 3:1 molar ratio as a 70% solids solution in methyl isobutyl ketone and butonol (9:1 weight ratio), 73 parts of DETA diketimine (73% solids in methyl isobutyl ketone), and 65 parts of methyl ethanol amine and the mixture was held at 110° C. for one hour. Then, 283 parts of the reactive diluent of Example 1A, was added. The mixture was dispersed in 3234 parts of deionized water and 68 parts of lactic acid. The solvent was removed by vacuum distillation. The solids content of the solvent stripped dispersion was about 38%.

EXAMPLE 2B

An additive, which improved the appearance of the cured film, was prepared by adding Jeffamine D-2000(a polyoxypropylenediamine by Jefferson Chemical Company, Bellaire, Tex.), 133 parts, to 67 parts of polyepoxide (WPE=483, solids=75% in butoxyethanol) a period of about one-half hour. At the completion of the addition, the reaction mixture was heated to 130° C., held for 3 hours, followed by the addition of the 2 parts of butoxyethanol, were added along with 175 parts of polyurethane crosslinker (a reaction product of trimethyalpropane and a half-capping toluene diisocyanate (80/20 2,4-/2,6- isomer mixture with butoxyethanol) in 1:3 molar ratio as a 70% solids solution in butoxyethanol). The mixture was dispersed in 4 parts of acetic acid and 423 parts of deionized water.

EXAMPLE 2C

The grind resin was prepared by charging 55 parts of dimethyl ethanolamine to a half-capped urethane (a reaction product of Triton X-102 TM and 2,4-toluene diisocyanate as a 91.8% solids solution in methyl isobutyl ketone) at 60° C. The reaction was held at 70° C. for an hour then, 50 parts of ethylene glycol monobutyl ether, 75 parts of lactic acid, and 88 parts of deionized water were added, and the mixture was held for one-half hour. Next, about 177 parts of butoxyethanol and about 486 parts of EPON 1001F TM (WPE=650 from Shell Chemical, Houston, Tex.) were added, and the reaction mixture was held at 90° C. for four hours. The mixture was thinned with 2379 parts of deionized water.

EXAMPLE 2D

A pigment paste was prepared by grinding 269 parts of the grind resin of Example 2C, 57 parts of deionized water, 329 parts of titanium dioxide, 10 parts of carbon black, 19 parts of lead silicate, and 17 parts of dibutyl tin oxide in a steel ball shaker mill for about 3 hours so that the average particle size was less than 8 microns.

EXAMPLE 2E

A cationic electrodepositable paint was prepared by blending 1260 parts of the principal emulsion 2A, 248 parts of the additive 2B, 1885 parts of deionized water, and 406 parts of the pigment paste 2D. The bath had a pH of 6.2, and a total solids content of 22 wt. %. A phosphated steel panel electrocoated at 250V for two minutes gave a smooth film of 1.2 mil thickness after a 325° F. bake.

The cathodic electrodepositable resin compositions containing the reactive diluents of the present invention produce smooth coatings in an electrodeposition process either without the need for volatile organic coalescent solvents, or, with substantially reduced levels of coalescent solvents. It is surprising and unexpected that smooth coatings can be produced without the need for volatile organic coalescent solvents. It is known that the use of the reactive diluent (low Tg crosslinking agents) alone, i.e., without a principal or primary crosslinking agent, will result in electrodeposited coatings having poor corrosion resistance. However, the use of the reactive diluents of this invention with conventional primary crosslinking agents produces smooth, durable, corrosion resistant coatings without the need for coalescent solvents.

Although this invention has been shown and described with respect to detailed embodiments thereof, it will be understood by those skilled in the art that various changes in form and detail thereof may be made without departing from the spirit and scope of the claimed invention.

We claim:

1. In a cathodic electrodepositable resin composition comprising an epoxy resin/amine adduct, wherein the epoxy/amine-adduct is mixed with a primary crosslinking agent and salted to form a principle emulsion, the improvement comprising the inclusion of an additional crosslinking agent having Tg below ambient temperature as a reactive diluent in the principle emulsion, thereby producing a principle emulsion which, when incorporated into a coating bath, produces smooth electrodeposited films, thereby eliminating or substantially reducing the need for volatile organic coalescent solvents.

2. In a cathodic electrodeposition bath containing a mixture of a principle emulsion, wherein the principle emulsion comprises a salted epoxy resin/amine-adduct particularly adapted for use as a film forming composition in an electrodeposition process and a primary crosslinking agent, a pigment paste, and water, the improvement comprising the inclusion of an additional cross-linking agent having Tg below ambient temperature as a reactive diluent in the principle emulsion, thereby substantially reducing or eliminating the need for coalescent solvents in the coating bath and producing smooth electrodeposited films.

3. A method of electrocoating an object in a cathodic electrodeposition bath, comprising:
   forming an amine/epoxy resin adduct;
   mixing the adduct with a first crosslinking agent;
   mixing the adduct with a reactive diluent comprising a second, low Tg crosslinking agent;
   salting the adduct with an acid;
   thereby forming a principal emulsion;
   mixing the principal emulsion with a pigment paste and water to form a coating bath;
   connecting a conductive article to a DC electric circuit to act as a cathode and immersing the article in the bath;
   passing an electric current through the article, thereby depositing a film of resin and pigment paste on the article;
   removing the article from the bath and curing the deposited coating,
thereby producing a smooth deposited film and substantially reducing or eliminating the need for volatile organic coalescent solvents.

4. A coated article, wherein the article is coated by the method of claim 3.

5. The composition, method or coated article, respectively, of claims 1, 2, 3, or 4 wherein the cross-linking agent having a Tg below ambient temperature is a blocked aliphatic or aromatic polyisocyanate and the blocking agent is selected from the group consisting of oximes, alcohols, phenols, and caprolactam.

6. The composition, method or coated article, respectively, of claims 1, 2, 3, or 4 wherein the crosslinking agent having a Tg below ambient temperature comprises a blocked polyisocyanate wherein the polyisocyanate is selected from the group consisting of the isocyanurate of hexamethylene diisocyanate, the biuret of hexamethylene diisocyanate, and the adducts of ethoxylated or propoxylated trimethylol propane.

* * * * *